(12) United States Patent
Kokubun (10) Patent No.: US 11,969,900 B2
(45) Date of Patent: Apr. 30, 2024

(54) TEACHING APPARATUS, CONTROL METHOD, AND TEACHING PROGRAM

(71) Applicant: Seiko Epson Corporation, Tokyo (JP)

(72) Inventor: Yuchi Kokubun, Azumino (JP)

(73) Assignee: SEIKO EPSON CORPORATION (JP)

( * ) Notice: Subject to any disclaimer, the term of this patent is extended or adjusted under 35 U.S.C. 154(b) by 381 days.

(21) Appl. No.: 17/102,717

(22) Filed: Nov. 24, 2020

(65) Prior Publication Data

US 2021/0154845 A1 May 27, 2021

(30) Foreign Application Priority Data

Nov. 25, 2019 (JP) ................................. 2019-212397

(51) Int. Cl.
*G06G 7/48* (2006.01)
*B25J 9/16* (2006.01)
*G06F 3/048* (2013.01)

(52) U.S. Cl.
CPC ............. *B25J 9/1671* (2013.01); *B25J 9/163* (2013.01); *G06F 3/048* (2013.01)

(58) Field of Classification Search
CPC ..................... B25J 9/163; B25J 9/1671; G05B 2219/36159; G05B 2219/39446; G06F 3/048
See application file for complete search history.

(56) References Cited

U.S. PATENT DOCUMENTS

| | | | |
|---|---|---|---|
| 5,937,143 A | 8/1999 | Watanabe et al. | |
| 2007/0282485 A1* | 12/2007 | Nagatsuka | G05B 19/4069 700/245 |
| 2014/0236565 A1 | 8/2014 | Kuwahara | |
| 2015/0112482 A1* | 4/2015 | Kuwahara | G06N 20/00 901/50 |
| 2015/0151431 A1* | 6/2015 | Suyama | B25J 9/1605 901/5 |
| 2015/0379171 A1* | 12/2015 | Kuwahara | G06F 30/20 703/13 |
| 2018/0029232 A1 | 2/2018 | Ouchi et al. | |

FOREIGN PATENT DOCUMENTS

| | | |
|---|---|---|
| CN | 202985565 U | 6/2013 |
| JP | 2006-142480 A | 6/2006 |
| JP | 2007334551 A | 12/2007 |
| JP | 2014-161921 A | 9/2014 |
| JP | 2018015857 A | 2/2018 |

* cited by examiner

*Primary Examiner* — Rehana Perveen
*Assistant Examiner* — Nithya J. Moll
(74) *Attorney, Agent, or Firm* — Harness, Dickey & Pierce, P.L.C.

(57) ABSTRACT

A teaching apparatus includes a display unit having a simulation area in which a viewpoint for a virtual robot as a simulation model of a robot is changeably displayed and an operation area in which a plurality of operation signs for moving a control point of the virtual robot by changing a posture of the virtual robot are displayed, and a display control unit that controls actuation of the display unit, wherein the display control unit changes directions of the respective operation signs in the operation area to interlock with a change of the viewpoint for the virtual robot in the simulation area.

7 Claims, 10 Drawing Sheets

TEACHING APPARATUS, CONTROL METHOD, AND TEACHING PROGRAM

The present application is based on, and claims priority from JP Application Serial Number 2019-212397, filed Nov. 25, 2019, the disclosure of which is hereby incorporated by reference herein in its entirety.

BACKGROUND

1. Technical Field

The present disclosure relates to a teaching apparatus, control method, and teaching program.

2. Related Art

Teaching apparatuses used prior to various works by robots for teaching details of the works to the robots are known. A teaching apparatus disclosed in JP-A-2006-142480 has a display unit that displays a simulation model of a robot and an operation button for changing the attitude of the simulation model.

In the teaching apparatus of JP-A-2006-142480, an operator may change the posture of the simulation model by operating the operation button while viewing the simulation model and teach operation details of the robot.

However, depending on the posture of the simulation model and the viewpoint for the simulation model, teaching may be difficult because the direction in which the posture of the simulation model is desired to be changed and the direction of the operation button differ.

SUMMARY

The present disclosure has been achieved to solve at least a part of the above described problem and can be implemented as below.

A teaching apparatus according to an application example includes a display unit having a simulation area in which a viewpoint for a virtual robot as a simulation model of a robot is changeably displayed and an operation area in which a plurality of operation signs for moving a control point of the virtual robot by changing a posture of the virtual robot are displayed, and a display control unit that controls actuation of the display unit, wherein the display control unit changes directions of the respective operation signs in the operation area to interlock with a change of the viewpoint for the virtual robot in the simulation area.

A control method according to an application example is a control method of controlling display of a display unit of a teaching apparatus, including displaying a simulation area containing a virtual robot as a simulation model of a robot and an operation area containing a plurality of operation signs for moving a control point of the virtual robot by changing a posture of the virtual robot, changing the viewpoint for the virtual robot in the simulation area, and changing directions of the respective operation signs in the operation area to interlock with a change of the viewpoint for the virtual robot.

A teaching program according to an application example is for execution of the control method according to the present disclosure.

DESCRIPTION OF EXEMPLARY EMBODIMENTS

As below, a teaching apparatus, control method, and teaching program according to the present disclosure will be explained in detail based on preferred embodiments shown in the accompanying drawings.

First Embodiment

Figure 1:
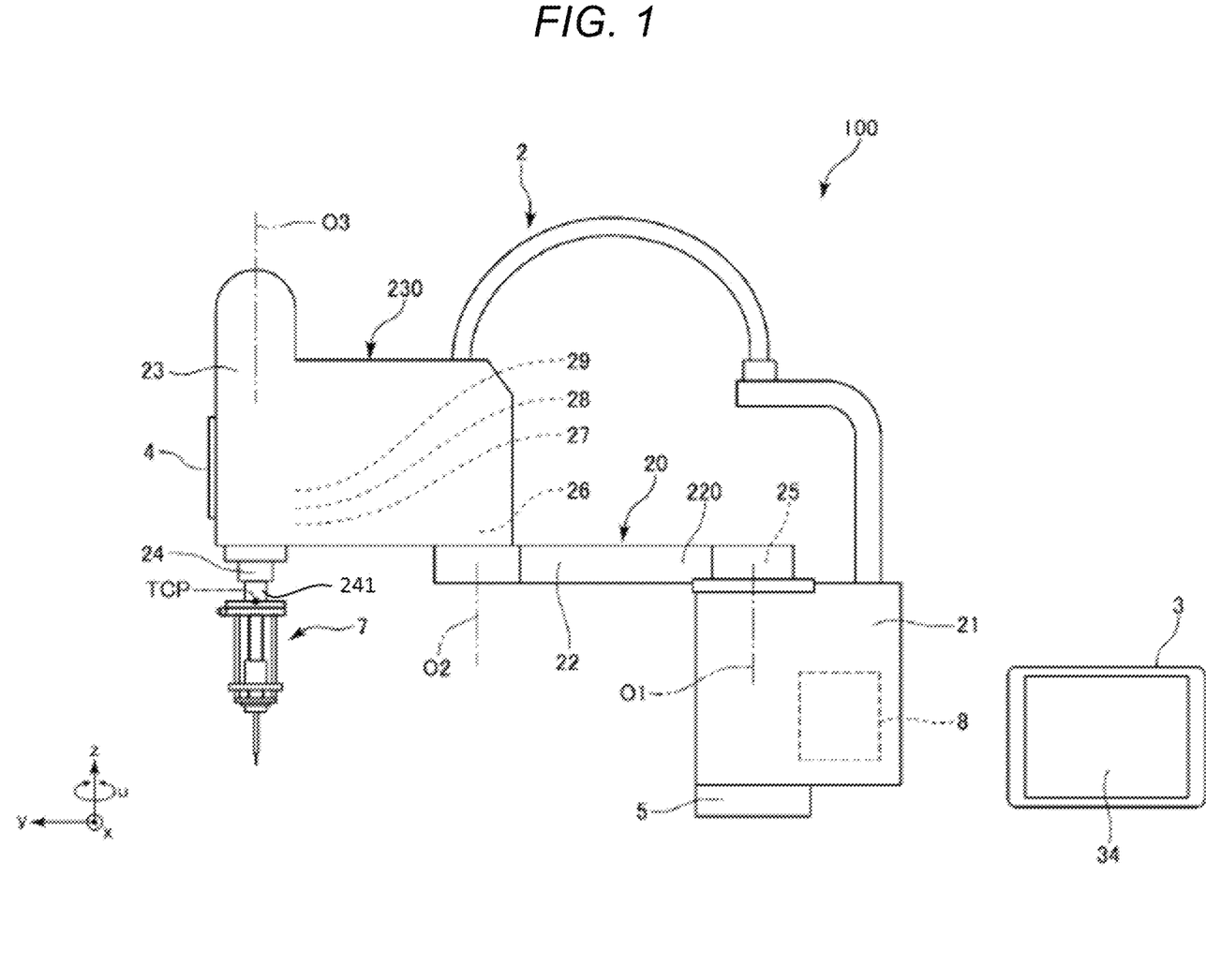
FIG. 1 is a schematic configuration diagram of a robot system including a teaching apparatus according to the present disclosure.
Figure 2:
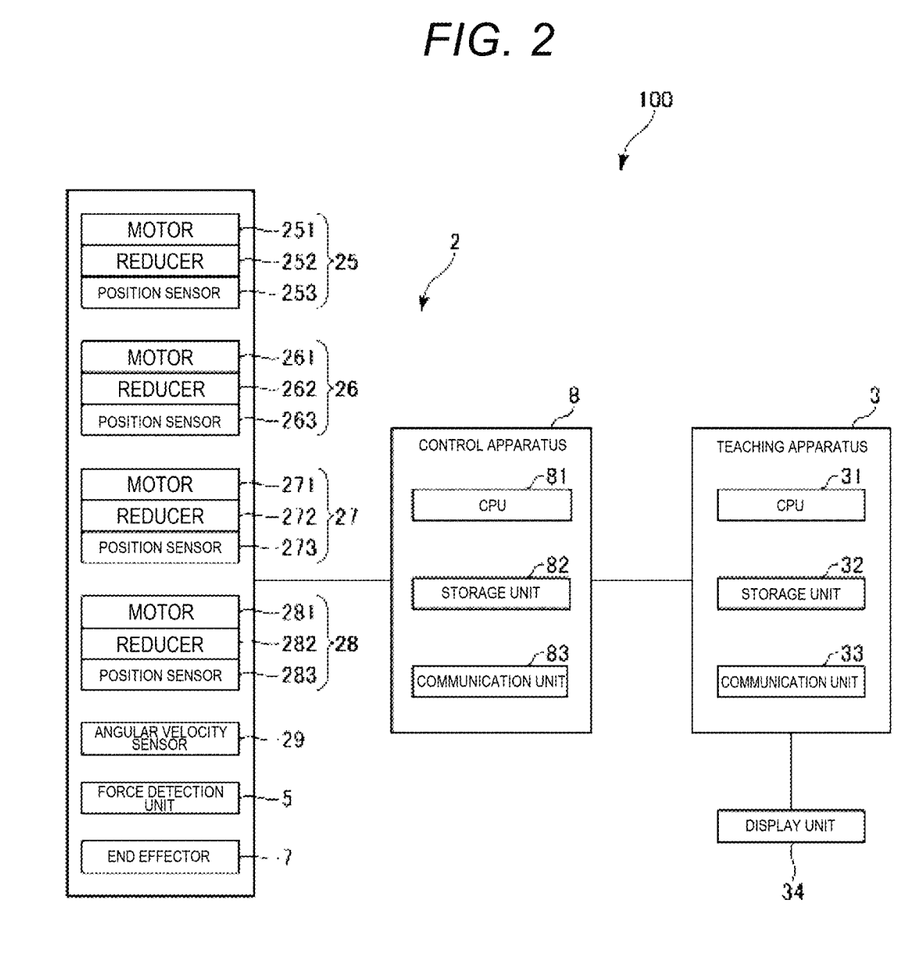
FIG. 2 is a block diagram of the robot system shown in FIG. 1.
Figure 3:
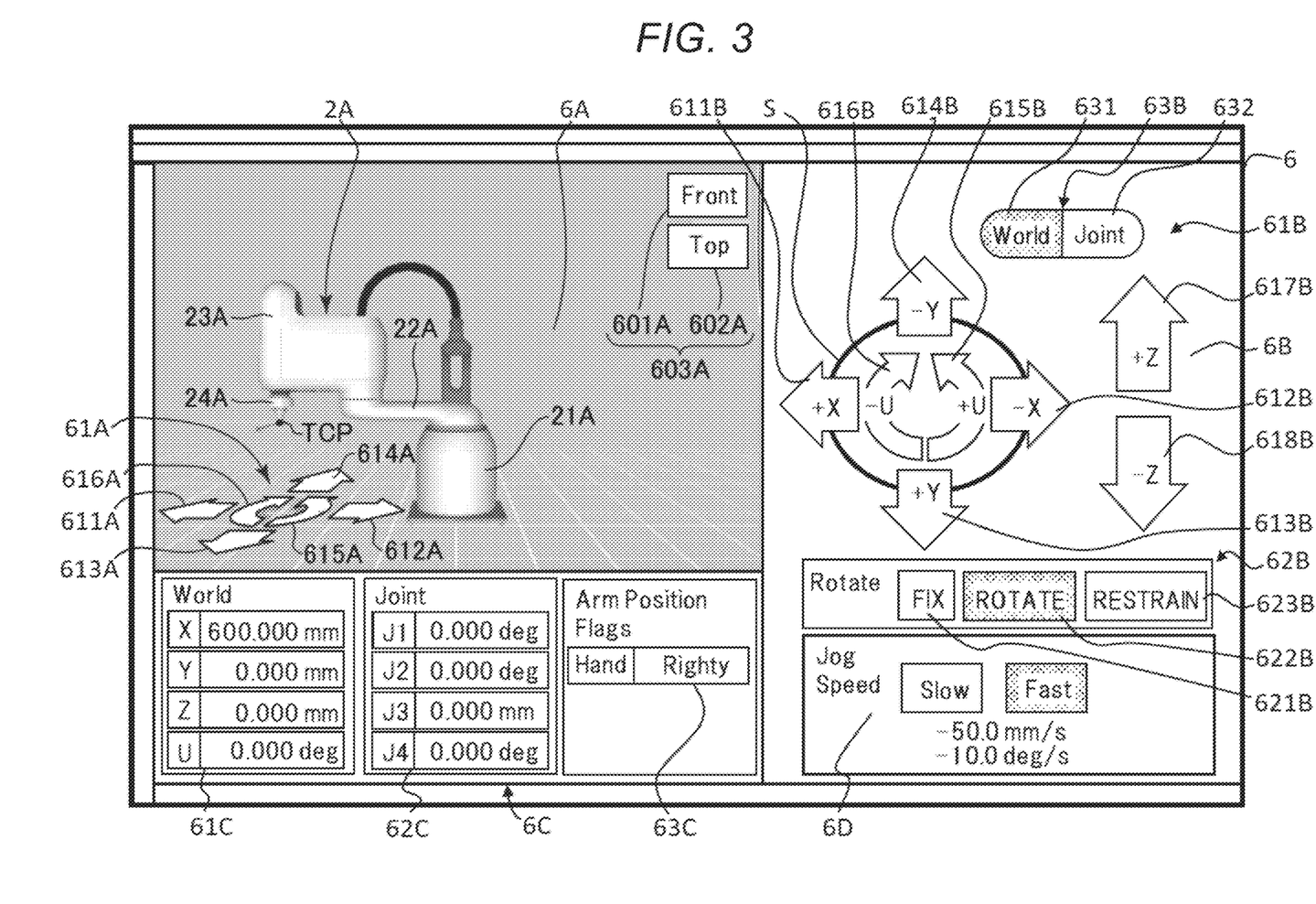
FIG. 3 shows a display screen of a display unit provided in the teaching apparatus shown in FIG. 1.
Figure 4:
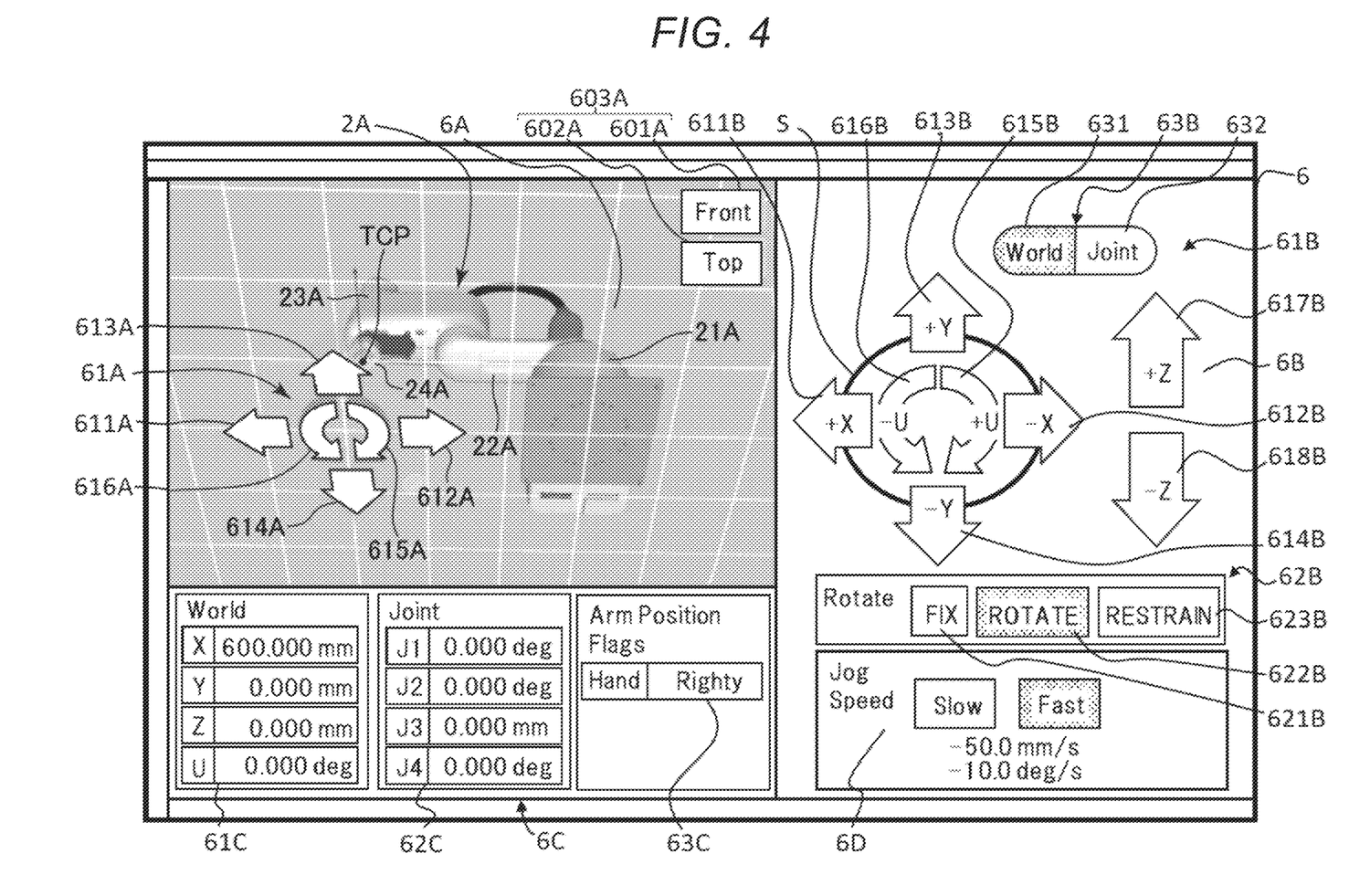
FIG. 4 shows the display screen of the display unit provided in the teaching apparatus shown in FIG. 1.
Figure 5:
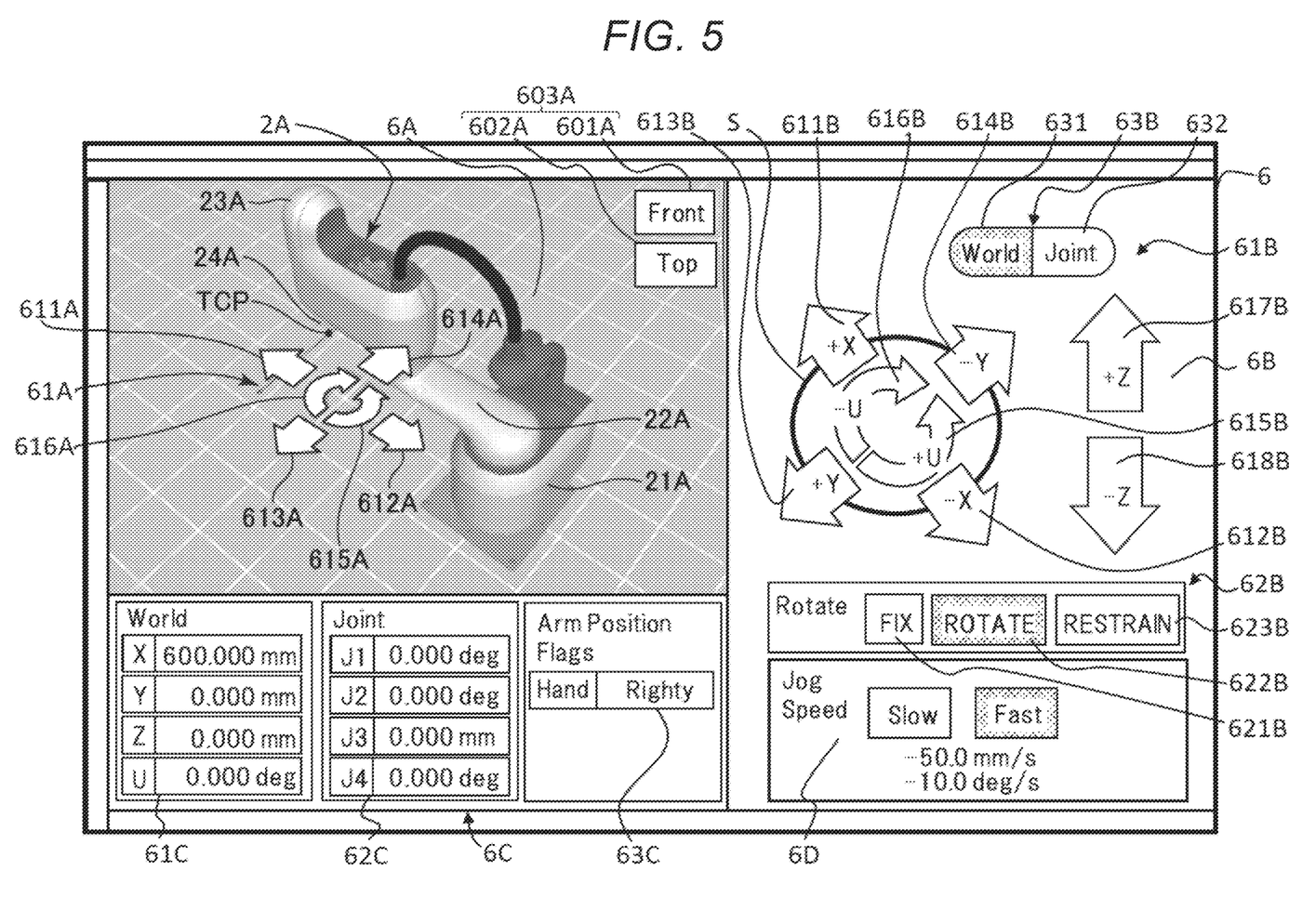
FIG. 5 shows the display screen of the display unit provided in the teaching apparatus shown in FIG. 1.
Figure 6:
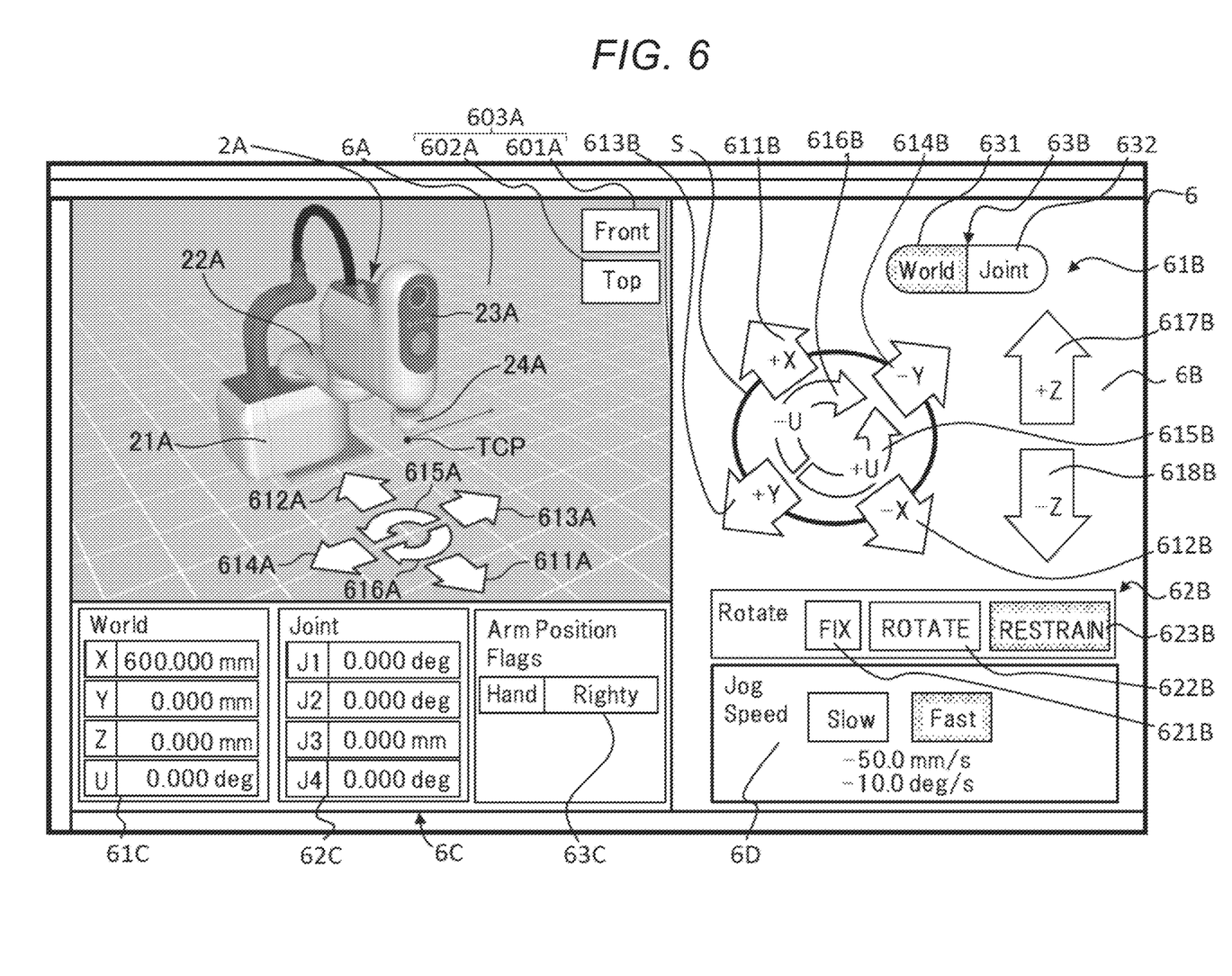
FIG. 6 shows the display screen of the display unit provided in the teaching apparatus shown in FIG. 1.
Figure 7:
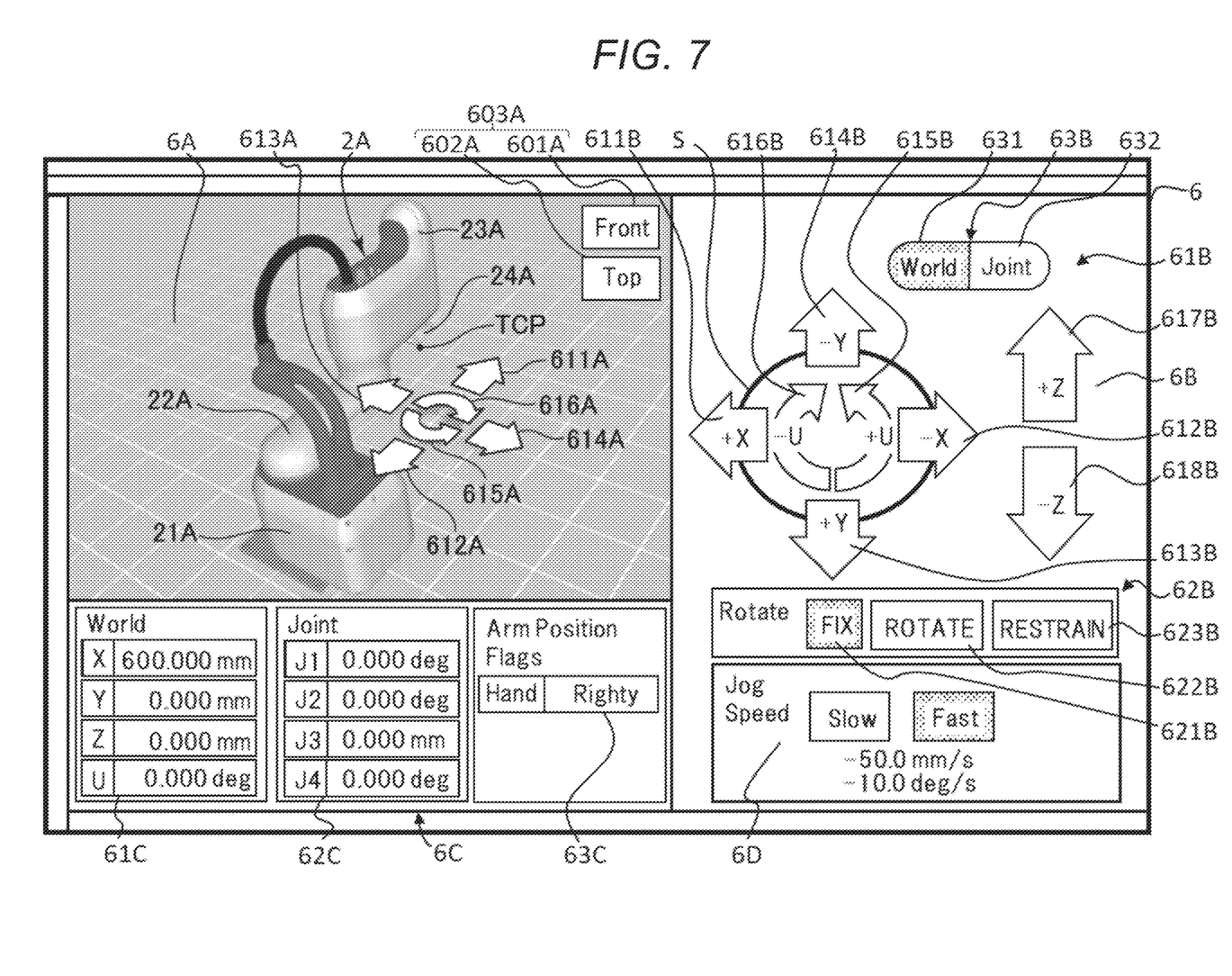
FIG. 7 shows the display screen of the display unit provided in the teaching apparatus shown in FIG. 1.
Figure 8:
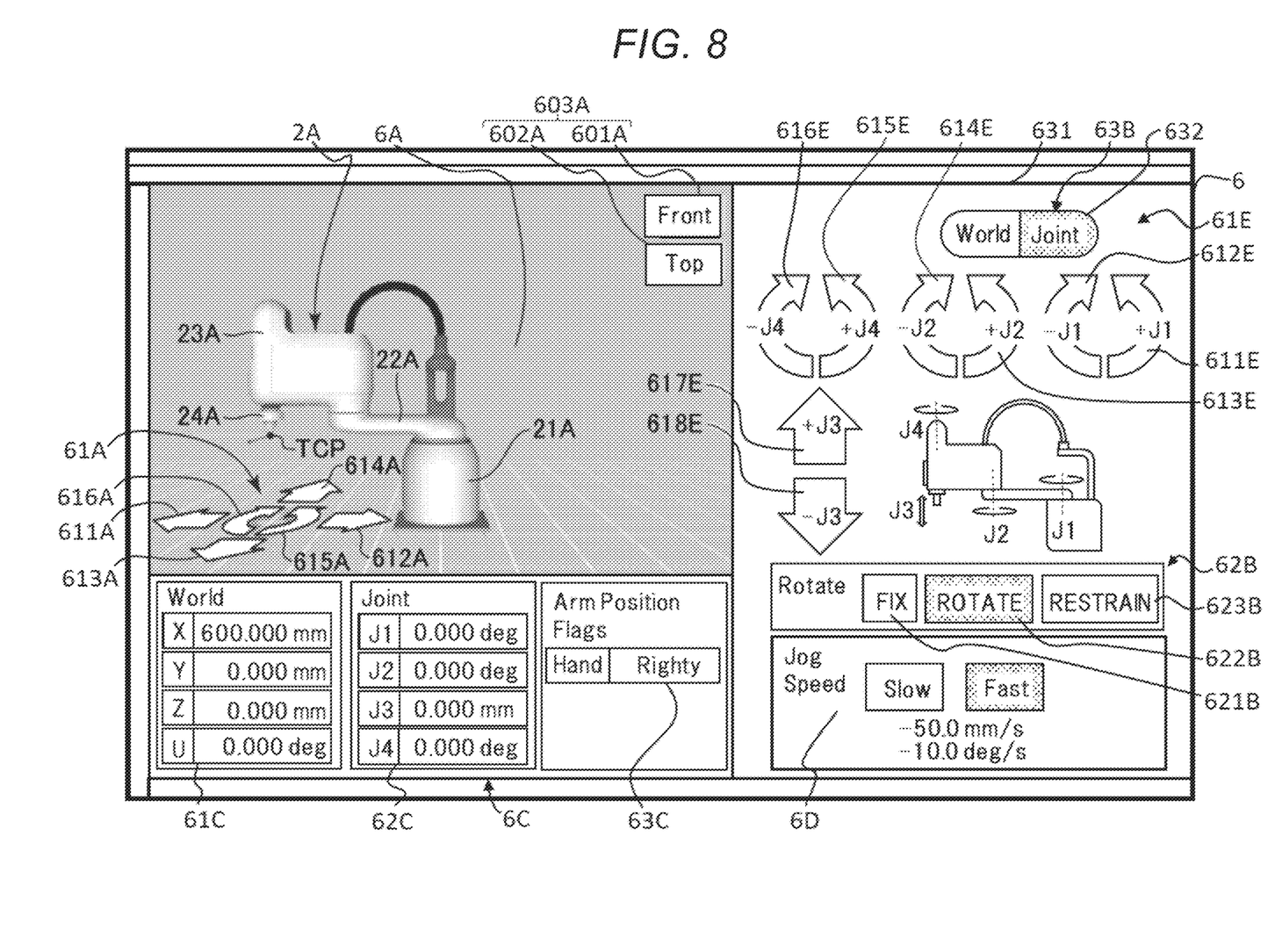
FIG. 8 shows the display screen of the display unit provided in the teaching apparatus shown in FIG. 1.
Figure 9:
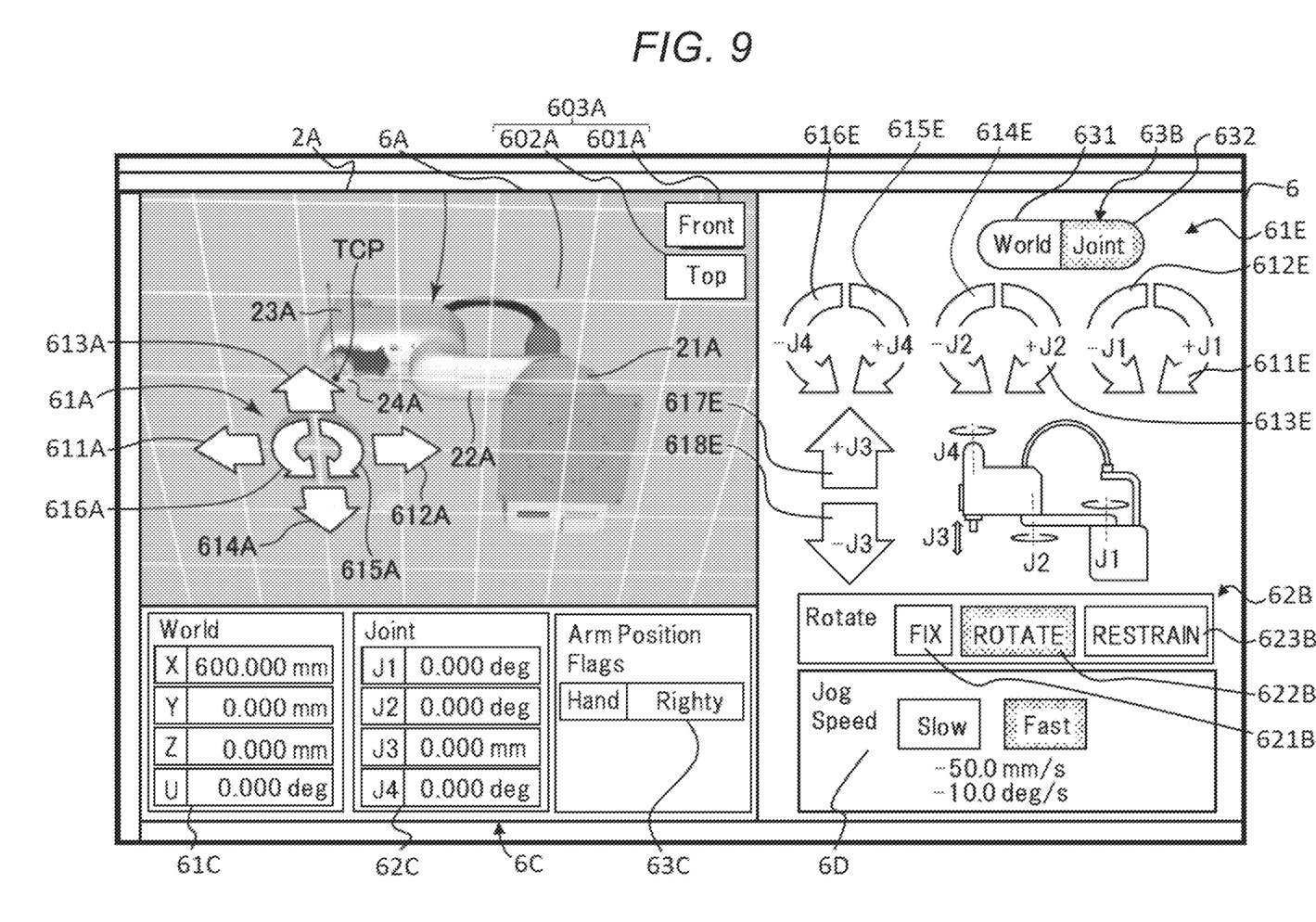
FIG. 9 shows the display screen of the display unit provided in the teaching apparatus shown in FIG. 1.
Figure 10:
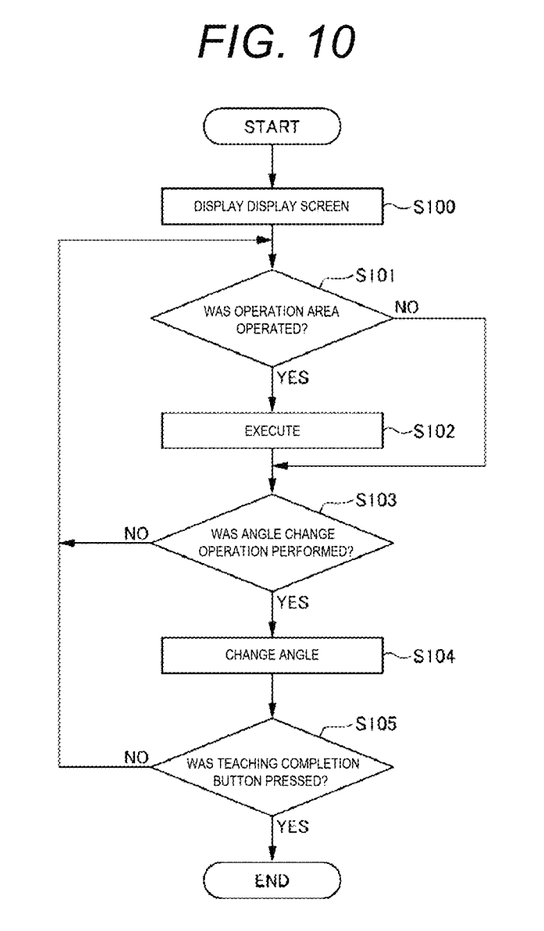
FIG. 10 is a flowchart for explanation of a control method for the teaching apparatus shown in FIG. 1.

FIG. 1 is the schematic configuration diagram of the robot system including the teaching apparatus according to the present disclosure. FIG. 2 is the block diagram of the robot system shown in FIG. 1. FIG. 3 shows the display screen of the display unit provided in the teaching apparatus shown in FIG. 1. FIG. 4 shows the display screen of the display unit provided in the teaching apparatus shown in FIG. 1. FIG. 5 shows the display screen of the display unit provided in the teaching apparatus shown in FIG. 1. FIG. 6 shows the display screen of the display unit provided in the teaching apparatus shown in FIG. 1. FIG. 7 shows the display screen of the display unit provided in the teaching apparatus shown in FIG. 1. FIG. 8 shows the display screen of the display unit provided in the teaching apparatus shown in FIG. 1. FIG. 9 shows the display screen of the display unit provided in the teaching apparatus shown in FIG. 1. FIG. 10 is the flowchart for explanation of the control method for the teaching apparatus shown in FIG. 1.

In FIG. 1, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the pointer sides of the respective arrows in the drawings are referred to as "+ (plus)" and the tail sides are referred to as "− (minus)", and directions about the z-axis and directions about an axis parallel to the z-axis are also referred to as "u-axis directions". Furthermore, of "x-axis directions", the direction toward the pointer side of the arrow is also referred to as "x-axis positive direction" and the direction toward the tail side of the arrow is also referred to as "x-axis negative direction". Of "y-axis directions", the direction toward the pointer side of the arrow is also referred to as "y-axis positive direction" and the direction toward the tail side of the arrow is also referred to as "y-axis negative direction". Of "z-axis directions", the direction toward the pointer side of the arrow is also referred to as "z-axis positive direction" and the direction toward the tail side of the arrow is also referred to as "z-axis negative direction". Moreover, of "u-axis directions", the counter-clockwise direction as seen in the z-axis negative direction is also referred to as "u-axis positive direction" and the clockwise direction as seen in the z-axis negative direction is also referred to as "u-axis negative direction".

Hereinafter, for convenience of explanation, the z-axis positive direction, i.e., the upside in FIG. 1 is also referred to as "upper" or "above" and the z-axis negative direction, i.e., the downside is also referred to as "lower" or "below". Further, with respect to a robot arm 20, a base 21 side in FIG. 1 is referred to as "proximal end" and the opposite side, i.e., an end effector 7 side is referred to as "distal end". Furthermore, the z-axis directions, i.e., upward and downward directions in FIG. 1 are referred to as "vertical directions" and the x-axis directions and the y-axis directions, i.e., leftward and rightward directions are referred to as "horizontal directions".

A robot system 100 shown in FIGS. 1 and 2 is used for work of e.g. holding, transport, assembly, inspection, etc. of works including electronic components and electronic apparatuses. The robot system 100 includes a robot 2 and a teaching apparatus 3 that teaches a motion program to the robot 2. The robot 2 and the teaching apparatus 3 can communicate via wired or wireless connection and the communication may be made via a network such as the Internet.

Teaching refers to designation of a motion program for the robot 2 and specifically refers to input of a position and a posture of the robot arm 20 to a control apparatus 8. The teaching includes direct teaching and indirect teaching, and the present disclosure relates to indirect teaching using the teaching apparatus 3.

The direct teaching refers to storage of a motion of the robot arm 20 in the control apparatus 8 or the teaching apparatus 3 by moving the robot arm 20 into predetermined position and posture while applying an external force to the robot arm 20 and operating a teach button of a receiving unit 4 at a desired time.

Further, the indirect teaching refers to storage of a motion of the robot arm 20 in the control apparatus 8 or the teaching apparatus 3 by changing a position and a posture of a virtual robot 2A displayed on a display unit 34, which will be described later, and operating a teach button of the display unit 34 at a desired time.

First, the robot 2 is explained.

The robot 2 is a horizontal articulated robot, i.e., a scalar robot in the illustrated configuration. As shown in FIG. 1, the robot 2 includes abase 21, the robot arm 20 coupled to the base 21, the receiving unit 4 that receives a predetermined operation from an operator, a force detection unit 5, an end effector 7, and the control apparatus 8 that controls actuation of these respective units.

The base 21 is a part supporting the robot arm 20. In the base 21, the control apparatus 8, which will be described later, is provided. Further, in an arbitrary portion of the base 21, the origin of the robot coordinate system is set. Note that the x-axis, the y-axis, and the z-axis shown in FIG. 1 are the axes of the robot coordinate system.

The robot arm 20 includes a first arm 22, a second arm 23, and a third arm 24 as a working head.

Note that the robot 2 is not limited to the illustrated configuration, but the number of arms may be one, two, four, or more.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, a z-drive unit 28 that moves the shaft 241 in the z-axis directions relative to the second arm 23, and an angular velocity sensor 29.

As shown in FIGS. 1 and 2, the drive unit 25 is provided inside of a housing 220 of the first arm 22 and has a motor 251 that generates a drive force, a reducer 252 that reduces the drive force of the motor 251, and a position sensor 253 that detects the rotation angle of the rotation shaft of the motor 251 or the reducer 252.

The drive unit 26 is provided inside of a housing 230 of the second arm 23 and has a motor 261 that generates a drive force, a reducer 262 that reduces the drive force of the motor 261, and a position sensor 263 that detects the rotation angle of the rotation shaft of the motor 261 or the reducer 262.

The u-drive unit 27 is provided inside of the housing 230 of the second arm 23 and has a motor 271 that generates a drive force, a reducer 272 that reduces the drive force of the motor 271, and a position sensor 273 that detects the rotation angle of the rotation shaft of the motor 271 or the reducer 272.

The z-drive unit 28 is provided inside of the housing 230 of the second arm 23 and has a motor 281 that generates a drive force, a reducer 282 that reduces the drive force of the motor 281, and a position sensor 283 that detects the rotation angle of the rotation shaft of the motor 281 or the reducer 282.

As the motor 251, the motor 261, the motor 271, and the motor 281, e.g. servo motors such as AC servo motors or DC servo motors may be used.

As the reducer 252, the reducer 262, the reducer 272, and the reducer 282, e.g. planet gear reducers, wave gearings, or the like may be used. Further, as the position sensor 253, the position sensor 263, the position sensor 273, and the position sensor 283, e.g. angle sensors may be used.

The drive unit 25, the drive unit 26, the u-drive unit 27, and the z-drive unit 28 are respectively coupled to corresponding motor drivers (not shown) and controlled by the control apparatus 8 via the motor drivers.

As shown in FIG. 1, the angular velocity sensor 29 is provided inside of the second arm 23. Accordingly, the sensor may detect the angular velocity of the second arm 23. The control apparatus 8 performs control of the robot 2 based on information of the detected angular velocity.

The base 21 is fixed to e.g. a floor surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 drives, the first arm 22 rotates within a horizontal plane about the first axis O1 relative to the base 21. The position sensor 253 is configured to detect the amount of rotation of the first arm 22 relative to the base 21.

The second arm 23 is coupled to the distal end port ion of the first arm 22. The second arm 23 is rotatable about a second axis O2 along the vertical directions relative to the first arm 22. The axial direction of the first axis O1 and the axial direction of the second axis O2 are the same. That is, the second axis O2 is parallel to the first axis O1. When the drive unit 26 that rotates the second arm 23 drives, the second arm 23 rotates within a horizontal plane about the second axis O2 relative to the first arm 22. The position sensor 263 is configured to detect the amount of drive, specifically, the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is the arm at the most distal end of the robot arm 20.

When the u-drive unit 27 that rotates the shaft 241 drives, the shaft 241 rotates about the z-axis. Further, the position sensor 273 is configured to detect the amount of rotation of the shaft 241 relative to the second arm 23.

When the z-drive unit 28 that moves the shaft 241 in the z-axis directions drives, the shaft 241 moves in the upward and downward directions, i.e., the z-axis directions. Further, the position sensor 283 is configured to detect the amount of movement of the shaft 241 in the z-axis directions relative to the second arm 23.

In the robot 2, with the distal end of the shaft 241 as a control point TCP, a distal end coordinate system having the origin at the control point TCP is set. The distal end coordinate system and the above described robot coordinate system were calibrated and a position in the distal end coordinate system may be transformed into that in the robot coordinate system. Thereby, the position of the control point TCP may be located in the robot coordinate system.

Further, various end effectors are detachably coupled to the distal end portion of the shaft 241. The end effector is not particularly limited to, but includes e.g. one that grips an object to be transported, one that processes an object to be processed, and one used for inspection. In the embodiment, the end effector 7 is detachably coupled.

The end effector 7 is not a component element of the robot 2 in the embodiment, however, a part or entire of the end effector 7 may be a component element of the robot 2.

As shown in FIG. 1, the force detection unit 5 detects a force applied to the robot 2, i.e., a force applied to the robot arm 20 and the base 21. In the embodiment, the force detection unit 5 is provided at the downside, i.e., in the z-axis negative direction of the base 21 and supports the base 21 from the downside.

The force detection unit 5 may include e.g. a plurality of elements formed using a piezoelectric material such as quartz crystal and outputting electric charge when subjected to an external force. The control apparatus 8 may perform conversion into an external force applied to the robot arm 20 according to the amounts of electric charge. Further, such a piezoelectric material can adjust the direction to generate the electric charge when subjected to the external force according to the direction in which the material is placed.

The receiving unit 4 is a part that receives the predetermined operation by the operator. The receiving unit 4 has a teaching button (not shown). The teaching button may be used when direct teaching is performed. The teaching button may be a mechanical button or touch-electric button. Further, a button having a different function may be placed around the operation button.

Next, the control apparatus 8 will be explained.

As shown in FIGS. 1 and 2, the control apparatus 8 is provided inside of the base 21 in the embodiment. Further, as shown in FIG. 5, the control apparatus 8 has a function of controlling driving of the robot 2 and is electrically coupled to the above described respective parts of the robot 2. The control apparatus 8 includes a CPU (Central Processing Unit) 81, a storage unit 82, and a communication unit 83. These respective units are coupled communicably with one another via e.g. a bus.

The CPU 81 reads and executes various programs etc. stored in the storage unit 82. A command signal generated in the CPU 81 is transmitted to the robot 2 via the communication unit 83. Thereby, the robot arm 20 may execute a predetermined work.

The storage unit 82 stores various programs etc. that can be executed by the CPU 81. The storage unit 82 includes e.g. a volatile memory such as a RAM (Random Access Memory), nonvolatile memory such as a ROM (Read Only Memory), and detachable external storage device.

The communication unit 83 respectively transmits and receives signals between the respective parts of the robot 2 and the teaching apparatus 3 using an external interface such as e.g. a wired LAN (Local Area Network) or wireless LAN.

Next, the teaching apparatus 3 will be explained.

As shown in FIG. 2, the teaching apparatus 3 has a function of controlling actuation of the robot arm 20 and has a CPU (Central Processing Unit) 31, a storage unit 32, a communication unit 33, and the display unit 34. The teaching apparatus 3 is not particularly limited to, but includes e.g. a tablet, personal computer, and smartphone.

The CPU 31 reads and executes various programs etc. stored in the storage unit 32. The various programs include e.g. a teaching program according to the present disclosure, which will be described later. The teaching program may be generated in the teaching apparatus 3, stored from an external recording medium such as e.g. a CD-ROM, or stored via a network or the like.

The signal generated in the CPU 31 is transmitted to the control apparatus 8 of the robot 2 via the communication unit 33. Thereby, the robot arm 20 may execute a predetermined work under a predetermined condition. Further, the CPU 31 controls driving of the display unit 34 shown in FIGS. 3 to 9. That is, the CPU 31 functions as a display control unit that controls actuation of the display unit 34.

The storage unit 32 stores various programs etc. that can be executed by the CPU 31. Further, the storage unit 32 includes e.g. a volatile memory such as a RAM (Random Access Memory), nonvolatile memory such as a ROM (Read Only Memory), and detachable external storage device.

The communication unit 33 transmits and receives signals between the control apparatus 8 and itself using an external interface such as e.g. a wired LAN (Local Area Network) or wireless LAN.

The display unit 34 includes various displays having a display screen 6. In the embodiment, as an example, a touch panel configuration, i.e., a configuration in which the display unit 34 has a display function and an input operation function is explained. When the operator touches the display screen 6, the CPU 31 performs control to change to predetermined display.

Note that the display unit is not limited to the configuration, but may separately include an input operation unit. In this case, the input operation unit includes e.g. a mouse and keyboard. Or, a configuration using both a touch panel and a mouse and keyboard may be employed.

During indirect teaching (hereinafter, simply referred to as "during teaching"), the display unit 34 displays a window as shown in FIGS. 3 to 9 on the display screen 6. The window has a simulation area 6A, an operation area 6B, a condition display area 6C, and a speed adjustment part 6D. The simulation area 6A and the condition display area 6C are sequentially displayed from the upside. The operation area 6B and the speed adjustment part 6D are sequentially displayed from the upside. Further, the simulation area 6A and the operation area 6B are sequentially displayed from the left side in the illustrated configuration.

Note that the present disclosure is not limited to the illustrated layout. Or, the simulation area 6A, the operation area 6B, the condition display area 6C, and the speed adjustment part 6D may be respectively displayed on different displays.

The simulation area 6A displays the virtual robot 2A as a simulation model of the robot 2 during teaching. The virtual robot 2A may be a 3D CG generated based on the robot 2 or a picture formed by imaging of the robot 2 in real time.

The virtual robot 2A and the above described robot 2 have the same configuration and the respective parts of the virtual robot 2A have the same signs as those of the respective parts of the robot 2 shown in FIG. 1, however, for convenience of explanation, the signs are omitted in FIGS. 3 to 9.

In the virtual robot 2A, a virtual robot coordinate system corresponding to the above described robot coordinate system is set, and a plurality of display signs 61A showing the x-axis directions, the y-axis direction, and the u-axis directions in the virtual robot coordinate system are displayed in the simulation area 6A.

The display signs 61A include an arrow 611A with characters "+x", an arrow 612A with characters "−x", an arrow 613A with characters "+y", an arrow 614A with characters "−y", an arrow 615A with characters "+u", and an arrow 616A with characters "−u". These arrow 61A to arrow 616A are the display signs indicating the directions of the respective axes and displayed in positions corresponding to a tool center point of the virtual robot 2A. Further, the directions indicated by these arrow 611A to arrow 616A are the same as the x-axis positive direction, the x-axis negative direction, the y-axis positive direction, the y-axis negative direction, the u-axis positive direction, and the u-axis negative direction, respectively in the virtual robot coordinate system.

When an area corresponding to the simulation area 6A of the display screen 6 is swiped, that is, when the area is touched with a finger and the finger is moved with contact, the viewpoint is changed according to the direction and the view becomes different. Thereby, the operator may change the viewpoint to a desired viewpoint and view the virtual robot 2A from a desired direction. That is, in the embodiment, the touch-display screen 6 functions as a viewpoint operation part. Note that, in this specification, the viewpoint refers to the direction of the line of vision and the viewpoint for the virtual robot refers to the direction in which the operator views the simulation model.

As described above, the display unit 34 has the display screen 6 as the viewpoint operation part for operation of changing the viewpoint for the virtual robot 2A. Thereby, the operator may change the viewpoint to a desired viewpoint and may view the virtual robot 2A from a desired direction.

Note that the viewpoint operation part is not limited to that described above, but may be e.g. a button displayed on the display screen 6 or the like. In this case, the button functions as the viewpoint operation part. Or, when the display screen 6 is not the touch-screen, for example, an operation may be performed while a cursor on the display screen 6 is moved using a mouse.

For example, when the operator touches a position corresponding to an operation button 601A with a word "Front" displayed in the simulation area A of the display screen 6, the viewpoint may be returned to an initial viewpoint or, when the operator touches a position corresponding to an operation button 602A with a word "Top", the viewpoint may be returned to a viewpoint for viewing the virtual robot 2A in the z-axis negative direction. That is, in the embodiment, the operation button 601A and the operation button 602A function as a reset operation part 603A.

As described above, the display unit 34 has the reset operation part 603A for returning the viewpoint to the initial viewpoint after the viewpoint for the virtual robot 2A is changed. Thereby, when the operator desires to return the viewpoint to the initial viewpoint during operation, the viewpoint may be promptly returned to the initial viewpoint and the superior convenience is obtained.

Note that, in a case of an interlock mode, arrow 611B to arrow 616B return to initial positions.

In response to the viewpoint change, the arrow 611A to arrow 616A also move. In any positions, the directions indicated by the arrow 611A to arrow 616A are the same as the x-axis positive direction, the x-axis negative direction, the y-axis positive direction, the y-axis negative direction, the u-axis positive direction, and the u-axis negative direction, respectively. In other words, when the viewpoint is changed, the arrow 611A to arrow 616A move so that the respectively indicated directions may be the same as the x-axis positive direction, the x-axis negative direction, the y-axis positive direction, the y-axis negative direction, the u-axis positive direction, and the u-axis negative direction of the virtual robot coordinate system, respectively.

As described above, in the simulation area 6A, the arrow 611A to arrow 616A as the display signs 61A corresponding to operation signs 61B are displayed. The CPU 31 as the display control unit controls the display unit 34 to change the directions of the arrow 611A to arrow 616A to interlock with the viewpoint change for the virtual robot 2A. Thereby, even when the viewpoint is changed, the posture of the virtual robot 2A may be easily known.

The condition display area 6C has a coordinate display part 61C, a rotation amount display part 62C, and an arm mode display part 63C.

The coordinate display part 61C displays the positions, i.e., the coordinates of the respective arms of the virtual robot 2A in the virtual robot coordinate system. The rotation amount display part 62C displays rotation amounts of the respective joints of the virtual robot 2A. The arm mode display part 63C displays a left-arm mode or right-arm mode. Note that whether the left-arm mode or the right-arm mode is determined by the angle of the joint of the coupling portion of the first arm and the second arm.

The displayed contents, i.e., the numerical values and characters in the condition display area 6C change with the posture change of the virtual robot 2A. Thereby, the operator may know the posture of the virtual robot 2A more accurately and perform the teaching operation more easily.

The operation area 6B has a plurality of the operation signs 61B, a first mode change part 62B, and a second mode change part 63B.

The plurality of the operation signs 61B include an arrow 611B with characters "+x", an arrow 612B with characters "−x", an arrow 613B with characters "+y", an arrow 614B with characters "−y", an arrow 615B with characters "+u", an arrow 616B with characters "−u", an arrow 617B with characters "+z", and an arrow 618B with characters "−z".

The arrow 611B and the arrow 612B indicate opposite sides to each other and the arrow 613B and the arrow 614B indicate opposite sides to each other. Further, the arrow 611B to arrow 614B are arranged at equal intervals along a circumferential direction of a circle S. Furthermore, as will be described later, the arrow 611B to arrow 614B rotationally move along the circumferential direction of the circle S, but the relative positions of the arrow 611B to arrow 614B do not change.

The arrow 615B and the arrow 616B have arc shapes and are placed inside of the circle S. Further, the arrow 615B and the arrow 616B indicate opposite directions to each other. That is, the arrow 615B indicates the counter-clockwise direction and the arrow 615B indicates the clockwise direction.

As will be described later, the arrow 615B and the arrow 616B rotationally move along the circumferential direction of the circle S, but the relative positions of the arrow 615B to arrow 616B do not change. Further, the relative positions of the arrow 615B to arrow 616B to the arrow 611B to arrow 614B do not change. That is, the arrow 611B to arrow 616B rotate while maintaining the position relationship relative to one another.

The arrow 617B and the arrow 618B indicate opposite directions to each other and the arrow 617B indicates the upside and the arrow 618B indicates the downside. Note that the arrow 617B and the arrow 618B do not move with the rotation of the arrow 611B to arrow 616B. That is, even when the arrow 611B to arrow 616B rotate, the positions of the arrow 617B and the arrow 618B remain fixed. Note that, not limited to that, but the arrow 617B and the arrow 618B may be reversed or rotated with the rotation of the arrow 611B to arrow 616B.

The arrow 611B is a first x operation portion for moving the control point of the virtual robot 2A in the x-axis positive direction. When the operator touches the position corresponding to the arrow 611B on the display screen 6, the virtual robot 2A changes the posture so that the control point may move in the x-axis positive direction, i.e., toward the +x-axis side.

The arrow 612B is a second x operation portion for moving the control point of the virtual robot 2A in the x-axis negative direction. When the operator touches the position corresponding to the arrow 612B on the display screen 6, the virtual robot 2A changes the posture so that the control point may move in the x-axis negative direction, i.e., toward the −x-axis side.

The arrow 613B is a first y operation portion for moving the control point of the virtual robot 2A in the y-axis positive direction. When the operator touches the position corresponding to the arrow 613B on the display screen 6, the virtual robot 2A changes the posture so that the control point may move in the y-axis positive direction, i.e., toward the +y-axis side.

The arrow 614B is a second y operation portion for moving the control point of the virtual robot 2A in the y-axis negative direction. When the operator touches the position corresponding to the arrow 614B on the display screen 6, the virtual robot 2A changes the posture so that the control point may move in the y-axis negative direction, i.e., toward the −y-axis side.

The arrow 615B is a first u operation portion for rotating the shaft of the virtual robot 2A in the u-axis positive direction. When the operator touches the position corresponding to the arrow 615B on the display screen 6, the virtual robot 2A changes the posture so that the control point may move in the u-axis positive direction, i.e., toward the +u-axis side.

The arrow 616B is a second u operation portion for rotating the shaft of the virtual robot 2A in the u-axis negative direction. When the operator touches the position corresponding to the arrow 616B on the display screen 6, the virtual robot 2A changes the posture so that the control point may move in the u-axis negative direction, i.e., toward the −u-axis side.

The arrow 617B is a first z operation portion for moving the control point of the virtual robot 2A in the z-axis positive direction. When the operator touches the position corresponding to the arrow 617B on the display screen 6, the virtual robot 2A changes the posture so that the control point may move in the z-axis positive direction, i.e., toward the +z-axis side.

The arrow 618B is a second z operation portion for moving the control point of the virtual robot 2A in the z-axis negative direction. When the operator touches the position corresponding to the arrow 618B on the display screen 6, the virtual robot 2A changes the posture so that the control point may move in the z-axis negative direction, i.e., toward the −z-axis side.

These arrow 611B to arrow 618B are operated, and thereby, the posture of the virtual robot 2A may be changed. Further, the speed adjustment part 6D is operated, and thereby, the motion speed of the virtual robot 2A when the arrow 611B to arrow 618B are operated may be adjusted. The operator changes the posture of the virtual robot 2A by operating the arrow 611B to arrow 618B and presses the teaching button (not shown) at a desired time, and thereby, teaching of the robot 2 corresponding to the virtual robot 2A may be performed.

Note that, with the posture change of the virtual robot 2A, the posture of the robot 2 may be actually changed or the robot 2 may not necessarily be moved.

As described above, when the x-axis and the y-axis intersecting each other are set as the coordinate system of the virtual robot 2A, the plurality of operation signs 61B include the arrow 611B as the first x operation portion for moving the control point of the virtual robot 2A in the x-axis positive direction, i.e., toward the +x-axis side, the arrow 612B as the second x operation portion for moving the control point of the virtual robot 2A in the x-axis negative direction, i.e., toward the −x-axis side, the arrow 613B as the first y operation portion for moving the control point of the virtual robot 2A in the y-axis positive direction, i.e., toward the +y-axis side, and the arrow 614B as a second y operation portion for moving the control point of the virtual robot 2A in the y-axis negative direction, i.e., toward the −y-axis side. Further, the respective operation signs 61B are arranged counter-clockwise in the order of the arrow 611B to arrow 614B. Thereby, the operation of changing the posture of the virtual robot 2A may be easily performed.

Here, as described above, the viewpoint for the virtual robot 2A can be changed by the swipe operation in the simulation area 6A. With the viewpoint change, the directions indicated by the arrow 611A to arrow 616A displayed in the simulation area 6A change. In the present disclosure, the arrow 611B to arrow 616B displayed in the operation area 6B may move to interlock with the changes in the directions indicated by the arrow 611A to arrow 616A. That is, as shown in FIGS. 3 to 6, with the rotation of the arrow 611A to arrow 616A, the arrow 611B to arrow 616B also rotate in the same directions. Thereby, regardless of the posture of the virtual robot 2A, the operator may easily correlate the directions of the arrow 611A to arrow 616A displayed in the simulation area 6A with the directions of the arrow 611B to arrow 616B displayed in the operation area 6B and easily and accurately perform teaching.

Note that the directions respectively indicated by the arrow 611A to arrow 616A and the directions respectively indicated by the arrow 611B to arrow 616B may be the same or not completely the same.

As described above, the CPU 31 as the display control unit rotates the arrow 611B to arrow 614B along the circumferential direction of the circle S while keeping the relative position relationship of the arrow 611B as the first x operation portion, the arrow 612B as the second x operation portion, the arrow 613B as the first y operation portion, and the arrow 614B as the second y operation portion to interlock with the direction changes of the arrow 611A to arrow 614A as the display signs 61A. Thereby, the respective directions of the arrow 611A to arrow 614A in the simulation area 6A and the respective directions of the arrow 611B to arrow 614B in the operation area 6B may be correlated and teaching may be easily and accurately performed.

The first mode change part 62B has a fix button 621B displayed by "Fix", a rotate button 622B displayed by "Rotate", and a restrain button 623B displayed by "Restrain". The fix button 621B, the rotate button 622B, and the restrain button 623B are sequentially placed from the left side.

The fix button 621B is a non-interlock mode select portion for selecting a non-interlock mode in which the arrow 611B to arrow 616B do not interlock with the arrow 611A to arrow 616A. In the display screen 6, when the position corresponding to the fix button 621B is touched, as shown in FIG. 7, the non-interlock mode is set. The non-interlock mode is convenient for an operator good at operating in the non-interlock mode.

The rotate button 622B is an interlock mode select portion for selecting an interlock mode in which the arrow 611B to arrow 616B and the arrow 611A to arrow 616A interlock. In the display screen 6, when the position corresponding to the rotate button 622B is touched, as shown in FIGS. 5 and 6, the interlock mode in which the arrow 611B to arrow 616B and the arrow 611A to arrow 616A interlock is set, and the above described effect may be obtained.

The restrain button 623B is a restrain mode select portion for selecting a restrain mode in which the absolute positions of the arrow 611B to arrow 616B are fixed not to rotate at a desired time after the interlock mode is selected, i.e., not to interlock with the arrow 611A to arrow 616A. As shown in FIG. 6, in the display screen 6, when the position corresponding to the restrain button 623B is touched, the restrain mode is set and the arrow 611B to arrow 616B are fixed in the conditions when touched.

The restrain button 623B functions as a fix operation portion for fixing the absolute positions of the arrow 611B to arrow 616B. In other words, the teaching apparatus 3 has the restrain button 623B as the fix operation portion for fixing the absolute positions of the respective operation signs 61B, i.e., the arrow 611B to arrow 616B. Thereby, advantages of both the non-interlock mode and the interlock mode can be obtained.

The second mode change part 63B has a coordinate teach button 631 displayed by "World" and a joint teach button 632 displayed by "Joint". In the display screen 6, when the position corresponding to the coordinate teach button 631 is touched, a coordinate teach mode in which the posture of the virtual robot 2A is changed using the arrow 611B to arrow 616B corresponding to the x-axis, y-axis, z-axis, and u-axis of the virtual robot coordinate system shown in FIGS. 3 to 7. The coordinate teach mode is as described above.

On the other hand, in the display screen 6, when the position corresponding to the coordinate teach button 631 is touched, the mode is shifted to a joint teach mode shown in FIGS. 8 and 9. The joint teach mode is a mode in which the posture of the virtual robot 2A is changed using the joints, i.e., the arrows indicating the rotation directions of the respective joints of the virtual robot 2A. In the joint teach mode, in the operation area 6B, an arrow 611E, an arrow 612E, an arrow 613E, an arrow 614E, and arrow 615E, an arrow 616E, an arrow 617E, and an arrow 618E as a plurality of operation portions 61E are displayed.

In the arrow 611E, "+J1" is displayed and, in the arrow 612E, "−J1" is displayed. The arrow 611E and the arrow 612E have arc shapes located in the same circle and indicate opposite directions to each other. That is, in the state shown in FIG. 8, the arrow 611E is an arrow indicating the counter-clockwise direction and the arrow 612E is an arrow indicating the clockwise direction.

When the position corresponding to the arrow 611E is touched in the display screen 6, a first arm 22A of the virtual robot 2A rotates in the u-axis positive direction. On the other hand, when the position corresponding to the arrow 612E is touched in the display screen 6, the first arm 22A of the virtual robot 2A rotates in the u-axis negative direction.

In the arrow 613E, "+J2" is displayed and, in the arrow 614E, "−J2" is displayed. The arrow 613E and the arrow 614E have arc shapes located in the same circle and indicate opposite directions to each other. That is, in the state shown in FIG. 8, the arrow 613E is an arrow indicating the counter-clockwise direction and the arrow 614E is an arrow indicating the clockwise direction.

When the position corresponding to the arrow 613E is touched in the display screen 6, a second arm 23A of the virtual robot 2A rotates in the u-axis positive direction. On the other hand, when the position corresponding to the arrow 614E is touched in the display screen 6, the second arm 23A of the virtual robot 2A rotates in the u-axis negative direction.

In the arrow 615E, "+J4" is displayed and, in the arrow 616E, "−J4" is displayed. The arrow 615E and the arrow 616E have arc shapes located in the same circle and indicate opposite directions to each other. That is, in the state shown in FIG. 8, the arrow 615E is an arrow indicating the counter-clockwise direction and the arrow 616E is an arrow indicating the clockwise direction.

When the position corresponding to the arrow 615E is touched in the display screen 6, a third arm 24A of the virtual robot 2A rotates in the u-axis positive direction. On the other hand, when the position corresponding to the arrow 615E is touched in the display screen 6, the third arm 24A of the virtual robot 2A rotates in the u-axis negative direction.

In the arrow 617E, "+J3" is displayed and, in the arrow 618E, "−J3" is displayed. The arrow 617E and the arrow 618E are located in a straight line extending in the upward and downward directions and indicate opposite directions to each other. That is, in the state shown in FIG. 8, the arrow 617E indicates the upside and the arrow 618E indicates the downside.

When the position corresponding to the arrow 617E is touched in the display screen 6, the third arm 24A of the virtual robot 2A moves in the z-axis positive direction. On the other hand, when the position corresponding to the arrow 618E is touched in the display screen 6, the third arm 24A of the virtual robot 2A moves in the z-axis negative direction.

In the teaching apparatus 3, in the joint teach mode, the viewpoint shown in FIG. 8 is changed to the viewpoint shown in FIG. 9 in the simulation area 6A, and thereby, the interlock mode in which the arrow 611E to arrow 616E are vertically reversed may be set. That is, at the viewpoint of the virtual robot 2A as seen in the z-axis negative direction, as shown in FIG. 8, the pointers of the arrow 611E to arrow 616E are located at the upside and, at the viewpoint of the virtual robot 2A as seen in the z-axis positive direction, as shown in FIG. 9, the pointers of the arrow 611E to arrow 616E are located at the downside. Thereby, also, in the joint teach mode, the respective directions of the arrow 611A to arrow 616A in the simulation area 6A and the respective directions of the arrow 611E to arrow 616E in the operation area 6B may be correlated and teaching may be easily and accurately performed.

Note that, also, in the joint teach mode, the fix button 621B, the rotate button 622B, and the restrain button 623B fulfill the same functions as those in the above described coordinate teach mode and the explanation will be omitted.

As described above, the teaching apparatus 3 includes the display unit 34 having the simulation area 6A in which the viewpoint for the virtual robot 2A as the simulation model of the robot 2 is changeably displayed and the operation area 6B in which the plurality of operation signs 61B for moving the control point of the virtual robot 2A by changing the posture of the virtual robot 2A are displayed, and the CPU 31 as the display control unit that controls the actuation of the display unit 34. Further, the CPU 31 changes the directions of the respective operation signs 61B in the operation area 6B to interlock with the viewpoint change for the virtual robot 2A in the simulation area 6A. Thereby, the posture of the virtual robot 2A in the simulation area 6A and the directions of the operation signs 61B in the operation area 6B may be correlated and teaching may be easily and accurately performed.

Note that, in the embodiment, the viewpoint for the virtual robot 2A in the simulation area 6A is changed by the operation by the operator, however, the present disclosure is not limited to that. The viewpoint may be automatically changed based on a predetermined program.

Next, the control method according to the present disclosure, i.e., the control operation performed by the CPU 31 will be explained according to the flowchart shown in FIG. 10.

First, at step S100, the display screen 6 containing the simulation area 6A, the operation area 6B, and the condition display area 6C is displayed on the display unit 34.

Then, at step S101, whether or not the operation area 6B was operated is determined. That is, which button in the operation area 6B was operated is specified. At step S101, when a determination that the operation area 6B was operated is made, at step S102, the above described control is performed according to the operated button.

At step S101, when a determination that the operation area 6B was not operated is made, the process moves to step S103. At step S103, whether or not a viewpoint change operation for the virtual robot 2A was performed in the simulation area 6A is determined.

At step S103, when a determination that the viewpoint change operation was performed is made, at step S104, the viewpoint for the virtual robot 2A is changed. For example, when the viewpoint change operation was performed, the directions of the respective operation signs 61B, i.e., the arrow 611B to arrow 616B in the operation area 6B are changed to interlock with the viewpoint change for the virtual robot 2A in the simulation area 6A. Thereby, the posture of the virtual robot 2A in the simulation area 6A and the directions of the operation signs 61B in the operation area 6B may be correlated and teaching may be easily and accurately performed.

Note that, at step S103, when a determination that the viewpoint change operation was not performed is made, the process returns to step S101.

Then, at step S105, whether or not a teaching completion button (not shown) was pressed is determined. When a determination that the teaching completion button was pressed is made, teaching is ended. Note that, when a determination that the teaching completion button was not pressed is made, the process returns to step S101 and the subsequent steps are sequentially executed.

As described above, the control method according to the present disclosure is the control method of controlling the display of the display unit 34 of the teaching apparatus 3, including displaying the simulation area 6A containing the virtual robot 2A as the simulation model of the robot 2 and the operation area 6B containing the arrow 611B to arrow 616B as the plurality of operation signs 61B for moving the control point of the virtual robot 2A by changing the posture of the virtual robot 2A, changing the viewpoint for the virtual robot 2A in the simulation area 6A, and changing the directions of the arrow 611B to arrow 616B in the operation area 6B to interlock with the viewpoint change for the virtual robot 2A. Thereby, the posture of the virtual robot 2A in the simulation area 6A and the directions of the operation signs 61B in the operation area 6B may be correlated and teaching may be easily and accurately performed.

Further, the teaching program according to the present disclosure is for execution of the above described control method according to the present disclosure. Thereby, the teaching program that exerts the above described effects may be obtained.

Note that the teaching program according to the present disclosure may be stored in the storage unit 32, stored in a recording medium such as e.g. a CD-ROM, or stored in a storage device connectable via a network or the like.

As above, the teaching apparatus, control method, and teaching program according to the present disclosure are explained based on the illustrated embodiments, however, the present disclosure is not limited to those. The configurations of the respective parts may be replaced by arbitrary configurations having the same functions. Further, other arbitrary configurations and steps may be respectively added to the teaching apparatus, control method, and teaching program.

What is claimed is:

1. A teaching apparatus comprising:
   a display having a screen, the screen being divided into:
      a simulation area in which a 3D virtual robot as a simulation model of a robot and a plurality of first operation signs are displayed, the plurality of first operation signs being configured to be synchronized with a control point of the 3D virtual robot along or around an X axis, a Y axis, and a Z axis due to an operation by an operator, the X axis, the Y axis, and the Z axis being perpendicular to each other and being a coordinate system of the 3D virtual robot, the plurality of first operation signs including at least four directional signs corresponding to positive and negative X directions along the X axis and positive and negative Y directions along the Y axis; and
      an operation area in which a plurality of second operation signs are displayed, the plurality of second operation signs being configured to move or rotate the control point of the 3D virtual robot along or around the X axis, the Y axis, and the Z axis due to the operation by the operator, the plurality of second operation signs including at least the four directional signs; and a memory configured to store a program; and a processor configured to execute the program so as to:
cause the display to display the 3D virtual robot in the simulation area in an initial posture state, the plurality of first operation signs in the simulation area in an initial arrangement state, and the plurality of second operation signs in the operation area in the initial arrangement state, the initial posture state corresponding to the initial arrangement state;

move or rotate the 3D virtual robot in the simulation area due to the operation via the plurality of second operation signs in the operation area by the operator;

change a viewpoint of the 3D virtual robot for the operator due to a swiping operation of part of the simulation area by the operator such that the 3D virtual robot is displayed in the simulation area in a first posture state;

change the initial arrangement state of each of the plurality of first operation signs in the simulation area and the plurality of second operation signs in the operation area to a first arrangement state in response to the first posture state of the 3D virtual robot in the simulation area, the first posture state corresponding to the first arrangement state;

synchronize a state of the four directional signs of the plurality of first operation signs in the simulation area with a state of the four directional signs of the plurality of second operation signs in the operation area while the initial arrangement state is changed to the first arrangement state;

detect an input of a reset operation;

change the viewpoint of the 3D virtual robot from the first posture state to the initial posture state when processor detects the input of the reset operation; and synchronize the state of the four directional signs of the plurality of first operation signs in the simulation area with the state of the four directional signs of the plurality of second operation signs in the operation area while the first arrangement state is changed to the initial arrangement state.

2. The teaching apparatus according to claim 1, wherein the processor is configured to change directions of the four directional signs of the plurality of first operation signs in the simulation area in response to the change of the viewpoint of the 3D virtual robot.

3. The teaching apparatus according to claim 2, wherein the four directional signs are a first x operation portion for moving the control point of the 3D virtual robot in the positive X direction along the X axis, a second x operation portion for moving the control point of the 3D virtual robot in the negative X direction along the X axis, a first y operation portion for moving the control point of the 3D virtual robot in the positive Y direction along the Y axis, and a second y operation portion for moving the control point of the 3D virtual robot in the negative Y direction along the Y axis, and the four directional signs are arranged counter-clockwise in an order of the first x operation portion, the first y operation portion, the second x operation portion, and the second y operation portion in the operation area.

4. The teaching apparatus according to claim 3, wherein the processor is configured to rotate the four directional signs along a circumferential direction of a circle while maintaining a relative position relationship of the four directional signs in response to the change of the directions of the plurality of first operation signs.

5. The teaching apparatus according to claim 1, further comprising a fix operation portion for fixing an absolute position of each of the plurality of second operation signs.

6. A control method of controlling display of a display of a teaching apparatus, the control method for causing a processor to execute a program stored in a memory, the control method comprising executing on the processor the steps of:

displaying in a 3D virtual robot as a simulation model of a robot in a simulation area of a screen of the display in an initial posture state and a plurality of first operation signs in the simulation area in an initial arrangement state, the plurality of first operation signs being configured to be synchronized with a control point of the 3D virtual robot along or around an X axis, a Y axis, and a Z axis due to an operation by an operator, the X axis, the Y axis, and the Z axis being perpendicular to each other and being a coordinate system of the 3D virtual robot, the plurality of first operation signs including at least four directional signs corresponding to positive and negative X directions along the X axis and positive and negative Y directions along the Y axis;

displaying a plurality of second operation signs in an operation area of the screen of the display in the initial arrangement state corresponding to the initial posture state, the plurality of second operation signs being configured to move or rotate the control point of the 3D virtual robot along or around the X axis, the Y axis, and the Z axis due to the operation by the operator, the plurality of second operation signs including at least the four directional signs;

moving or rotating the 3D virtual robot in the simulation area due to the operation via the plurality of second operation signs in the operation area by the operator;

changing a viewpoint of the 3D virtual robot for the operator due to a swiping operation of part of the simulation area by the operator such that the 3D virtual robot is displayed in the simulation area in a first posture state;

changing the initial arrangement state of each of the plurality of first operation signs in the simulation area and the plurality of second operation signs in the operation area to a first arrangement state in response to the first posture state of the 3D virtual robot in the simulation area, the first posture state corresponding to the first arrangement state;

synchronizing a state of the four directional signs of the plurality of first operation signs in the simulation area with a state of the four directional signs of the plurality of second operation signs in the operation area while the initial arrangement state is changed to the first arrangement state;

detecting an input of a reset operation;

changing the viewpoint of the 3D virtual robot from the first posture state to the initial posture state when processor detects the input of the reset operation; and synchronizing the state of the four directional signs of the plurality of first operation signs in the simulation area with the state of the four directional signs of the plurality of second operation signs in the operation area while the first arrangement state is changed to the initial arrangement state.

7. A non-transitory computer-readable storage medium storing a teaching program for causing a computer to execute a process by a processor so as to perform the steps of:
- displaying a 3D virtual robot as a simulation model of a robot in a simulation area of a screen of the display in an initial posture state and a plurality of first operation signs in the simulation area in an initial arrangement state, the plurality of first operation signs being configured to be synchronized with a control point of the 3D virtual robot along or around an X axis, a Y axis, and a Z axis due to an operation by an operator, the X axis, the Y axis, and the Z axis being perpendicular to each other and being a coordinate system of the 3D virtual robot, the plurality of first operation signs including at least four directional signs corresponding to positive and negative X directions along the X axis and positive and negative Y directions along the Y axis;
- displaying a plurality of second operation signs in an operation area of the screen of the display in the initial arrangement state corresponding to the initial posture state, the plurality of second operation signs being configured to move or rotate the control point of the 3D virtual robot along or around the X axis, the Y axis, and the Z axis due to the operation by the operator, the plurality of second operation signs including at least the four directional signs;
- moving or rotating the 3D virtual robot in the simulation area due to the operation via the plurality of second operation signs in the operation area by the operator;
- changing a viewpoint of the 3D virtual robot for the operator due to a swiping operation of part of the simulation area by the operator such that the 3D virtual robot is displayed in the simulation area in a first posture state;
- changing the initial arrangement state of each of the plurality of first operation signs in the simulation area and the plurality of second operation signs in the operation area to a first arrangement state in response to the first posture state of the 3D virtual robot in the simulation area, the first posture state corresponding to the first arrangement state;
- synchronizing a state of the four directional signs of the plurality of first operation signs in the simulation area with a state of the four directional signs of the plurality of second operation signs in the operation area while the initial arrangement state is changed to the first arrangement state;
- detecting an input of a reset operation;
- changing the viewpoint of the 3D virtual robot from the first posture state to the initial posture state when processor detects the input of the reset operation; and
- synchronizing the state of the four directional signs of the plurality of first operation signs in the simulation area with the state of the four directional signs of the plurality of second operation signs in the operation area while the first arrangement state is changed to the initial arrangement state.

\* \* \* \* \*